(12) United States Patent
Soulsby et al.

(10) Patent No.: US 12,093,390 B2
(45) Date of Patent: Sep. 17, 2024

(54) METHOD OF OPERATING A MEDIA SCANNER

(71) Applicants: Airbus Operations Limited, Bristol (GB); Airbus Defence and Space GmbH, Taufkirchen (DE)

(72) Inventors: Hugh Soulsby, Bristol (GB); Adam Wedgbury, Bristol (GB); Kevin Ian Jones, Bristol (GB); Khan-Ferdous Wahid, Taufkirchen (DE)

(73) Assignees: AIRBUS OPERATIONS LIMITED, Bristol (GB); AIRBUS DEFENCE AND SPACE GmbH, Taufkirchen (DE)

( * ) Notice: Subject to any disclaimer, the term of this patent is extended or adjusted under 35 U.S.C. 154(b) by 253 days.

(21) Appl. No.: 17/767,281

(22) PCT Filed: Oct. 5, 2020

(86) PCT No.: PCT/EP2020/077771
§ 371 (c)(1),
(2) Date: Apr. 7, 2022

(87) PCT Pub. No.: WO2021/069340
PCT Pub. Date: Apr. 15, 2021

(65) Prior Publication Data
US 2022/0366049 A1 Nov. 17, 2022

(30) Foreign Application Priority Data
Oct. 8, 2019 (GB) ..................................... 1914519

(51) Int. Cl.
*G06F 21/56* (2013.01)
*G06F 13/40* (2006.01)
*G06F 21/85* (2013.01)

(52) U.S. Cl.
CPC ........ *G06F 21/566* (2013.01); *G06F 13/4022* (2013.01); *G06F 21/85* (2013.01)

(58) Field of Classification Search
CPC .... G06F 21/566; G06F 13/4022; G06F 21/85; G06F 21/82; G06F 21/83; G06F 21/56;
(Continued)

(56) References Cited

U.S. PATENT DOCUMENTS

| 2009/0083834 A1* | 3/2009 | Rubinstein ............ G06F 21/602 726/2 |
| 2010/0011442 A1 | 1/2010 | Zhao |

(Continued)

FOREIGN PATENT DOCUMENTS

CA    3 045 109    8/2018

OTHER PUBLICATIONS

International Search Report and Written Opinion of the International Searching Authority for PCT/EP2020/077771, dated Nov. 17, 2020 (12 pages).

*Primary Examiner* — Techane Gergiso
(74) *Attorney, Agent, or Firm* — Nixon & Vanderhye P.C.

(57) ABSTRACT

A method of operating a media scanner to protect a target machine from malware on a removable storage device is disclosed. The target machine and the removable storage device each include a respective data line, and the media scanner comprises a data switch. Data is scanned on the removable storage device with malware detection software of the media scanner via a first data path, the first data path comprising the data line of the removable storage device connected to the data line of the media scanner by the data switch in a first switching state. After the data has been scanned with the malware detection software, the data switch is operated to switch from the first switching state to a second switching state, thereby disconnecting the data line (Continued)

of the removable storage device from the data line of the media scanner and connecting the data line of the removable storage device to the data line of the target machine.

12 Claims, 6 Drawing Sheets

(58) Field of Classification Search
CPC .... G06F 21/561; G06F 21/562; G06F 21/563; G06F 21/564; G06F 21/565; G06F 21/567; G06F 21/568; G06F 2213/40; G06F 2213/4002; G06F 2213/4004; G06F 2213/0042
See application file for complete search history.

(56) References Cited

U.S. PATENT DOCUMENTS

| | | | |
|---|---|---|---|
| 2012/0131353 A1* | 5/2012 | Nasir | H04L 63/08 |
| | | | 726/17 |
| 2012/0317325 A1* | 12/2012 | Zhang | G06F 1/266 |
| | | | 710/301 |
| 2014/0337558 A1* | 11/2014 | Powers | G06F 13/42 |
| | | | 710/313 |
| 2015/0015184 A1* | 1/2015 | Su | H02J 7/00304 |
| | | | 320/107 |
| 2015/0365237 A1* | 12/2015 | Soffer | G06F 13/105 |
| | | | 726/20 |
| 2016/0196454 A1* | 7/2016 | Soffer | H01R 13/665 |
| | | | 726/16 |
| 2018/0097629 A1 | 4/2018 | Soffer | |
| 2019/0042749 A1* | 2/2019 | Appleboum | G06F 21/566 |

\* cited by examiner

METHOD OF OPERATING A MEDIA SCANNER

CROSS REFERENCE TO RELATED APPLICATIONS

The present application is a National Phase of International Application Number PCT/EP2020/077771 filed Oct. 5, 2020, which designated the U.S. and claims priority benefits from Great Britain Patent Application Number GB1914519.2, filed Oct. 8, 2019, the entire contents of each of which are hereby incorporated by reference.

FIELD OF THE INVENTION

The present invention relates to a method of operating a media scanner to protect a target machine from malware on a removable storage device. The invention also relates to a media scanner configured to perform such a method.

BACKGROUND OF THE INVENTION

Conventional methods of protecting a target machine from malware on a removable storage device involve installing malware detection software on the target machine. This may not be possible in an industrial environment. A further problem with such conventional methods is that legacy or older target machines may have operating systems that are out of support life so not able to run an up to date version of the malware detection software.

SUMMARY OF THE INVENTION

According to an aspect of the invention, there is provided a method of operating a media scanner to protect a target machine from malware on a removable storage device, wherein the target machine and the removable storage device each comprise a respective data line, and the media scanner comprises a data switch, the method comprising: a) scanning data on the removable storage device with malware detection software of the media scanner via a first data path, the first data path comprising the data line of the removable storage device connected to the data line of the media scanner by the data switch in a first switching state; b) after the data has been scanned with the malware detection software, operating the data switch to switch from the first switching state to a second switching state, thereby disconnecting the data line of the removable storage device from the data line of the media scanner and connecting the data line of the removable storage device to the data line of the target machine; c) transferring the data from the removable storage device to the target machine via a second data path, the second data path comprising the data line of the removable storage device connected to the data line of the target machine by the data switch in the second switching state; and d) after the removable storage device has been removed from the media scanner, returning the data switch back to its first switching state.

A further aspect of the invention provides a media scanner comprising a data line, a data switch, malware detection software, and a computer which is configured to operate the media scanner in order to protect a target machine from malware on a removable storage device by the method of the first aspect.

During the malware scanning step a), since the switches are in their first switching states, the target machine is isolated from the storage device. This is advantageous because it prevents the target machine from being infected by malware from the removable storage device.

The malware detection software is installed on the media scanner and not on the target machine, making the invention particularly useful in an industrial environment in which installing malware detection software on the target machine may be difficult or impossible. The media scanner can also run up to date versions of the malware detection software, so it can be used to protect a target machine with an operating system which is out of support life.

Preferably step b) is performed after the data has been scanned with the malware detection software and the storage device passed as safe (for instance with no malware, or any malware removed or quarantined).

Preferably the media scanner is a mobile device which can be physically coupled to the target machine, physically decoupled from the target machine, and then used to protect another target machine from malware. This enables the media scanner to be used to protect a number of target machines.

Optionally the target machine and the removable storage device each comprise a respective power line, and the media scanner comprises a power switch, the method further comprising: during the scanning step a), powering the removable storage device via a first power path, the first power path comprising the power line of the removable storage device connected to the power line of the media scanner by the power switch in a first switching state; after the scanning step a), operating the power switch to switch from its first switching state to a second switching state, thereby disconnecting the power line of the removable storage device from the power line of the media scanner and powering down the removable storage device; after the removable storage device has powered down, operating the power switch to switch from its second switching state to a third switching state, thereby connecting the power line of the removable storage device to the power line of the target machine and powering up the removable storage device via a second power path, the second power path comprising the power line of the removable storage device connected to the power line of the target machine by the power switch in the third switching state; during the data transfer step c), powering the removable storage device via the second power path; and after the removable storage device has been removed from the media scanner, returning the power switch back to its first switching state.

This switching process ensures that the storage device is powered by the same device that it is communicating with. This is particular advantageous if the storage device is a Universal Serial Bus (USB) device, because the power management of any attached USB device is an important part of the control of that device, affecting connection, operation and disconnection of the USB device.

Optionally the data switch and the power switch are integrated into a single switch board.

The powering up of the removable storage device may cause the removable storage device to perform a handshake process with the target machine via the second data path before the data transfer step c).

Optionally the removable storage device is powered up after the switching step b), so that the second data path is created before the removable storage device is powered up.

The method may further comprise operating the media scanner to detect a removal of the removable storage device from the media scanner, wherein the data switch and/or the power switch is returned back to its first switching state in response to the detection of the removal. This is advantageous because it prevents an undesirable oscillation which may occur in the absence of such a detection.

The removal of the removable storage device from the media scanner may be detected by detecting a reduction in power drawn by the removable storage device via the second power path. Alternatively the removal may be detected is some other way, for instance using a physical switch which senses whether the removable storage device is received in a socket of the media scanner.

The reduction in power may be detected by detecting a reduction in current flow.

The reduction in current flow may be detected by generating an amplified signal indicative of the current flow, and monitoring when the amplified signal crosses a threshold.

The method may further comprise operating the media scanner to check whether the media scanner is coupled to the target machine, and operating the data switch in step b) to switch from the first switching state to the second switching state if the check indicates that the target machine is coupled to the media scanner. This is advantageous because it prevents an undesirable oscillation which may occur in the absence of such a check that the media scanner is coupled to the target machine.

Optionally the media scanner is a mobile device which is physically coupled to the target machine during the data transfer step c), and the method further comprises physically decoupling the media scanner from the target machine after the data transfer step c). This decoupling may be achieved by unplugging a cable, for example.

The method may further comprise quarantining or removing malware if detected by the malware detection software.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
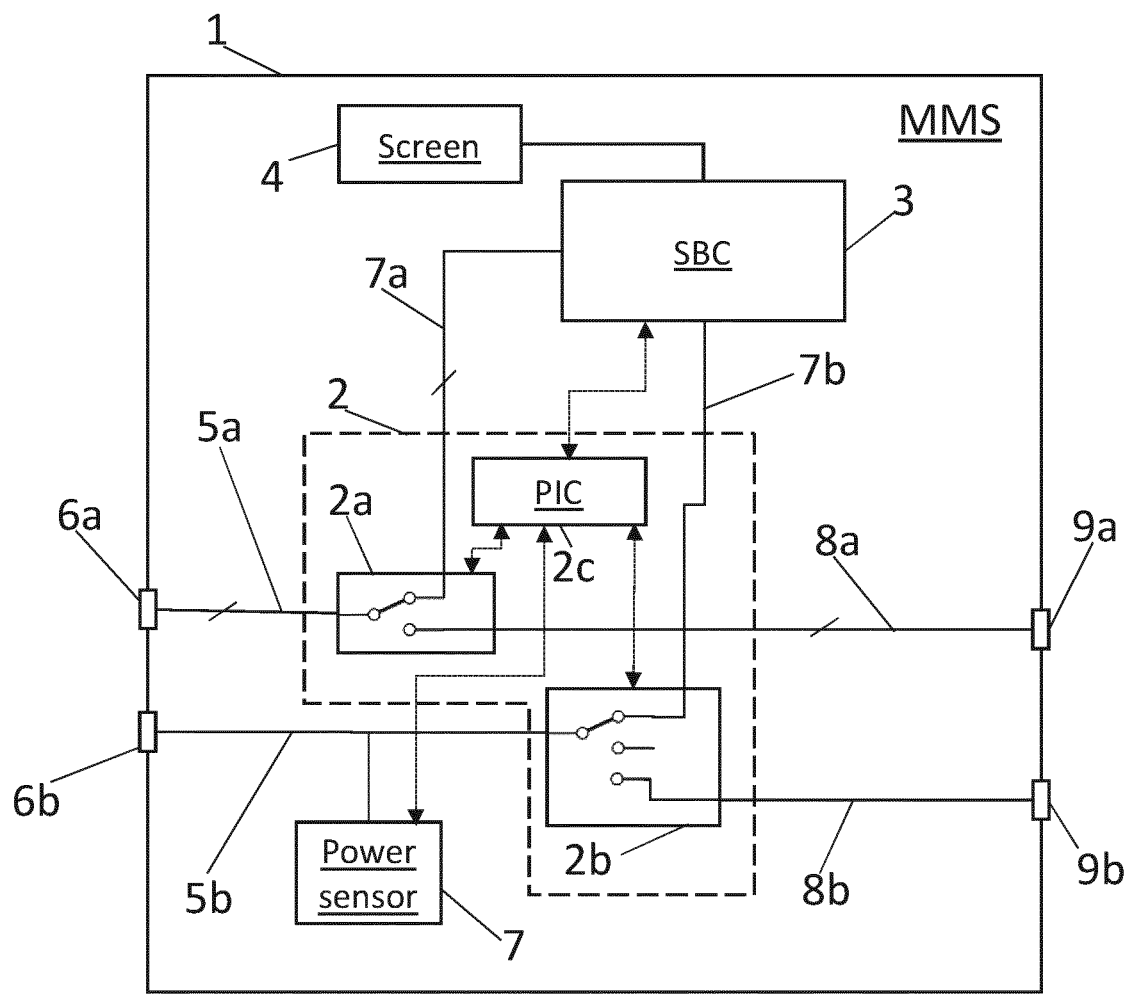
FIG. 1 is a schematic view of a mobile media scanner (MMS)

A mobile media scanner (MMS) 1 according to an embodiment of the invention is shown in FIG. 1. The MMS 1 is a mobile standalone device. The MMS 1 comprises a Universal Serial Bus (USB) switch board 2, a single board computer (SBC) 3, and a touch screen 4. The switch board 2 comprises a data switch 2a, a power switch 2b and a PIC (Programmable Intelligent Processor) processor 2c that controls the switches 2a, 2b. Alternatively the processor 2c may be another type of controller such as a Field Programmable Gate Array (FPGA). The switch board 2 will work with both USB versions 2 and 3.

A first MMS data line 5a leads from the data switch 2a to a device data port 6a; a second MMS data line 7a leads from the data switch 2a to the SBC 3; and a third MMS data line 8a leads from the data switch 2a to a target machine data port 9a.

A first MMS power line 5b leads from the power switch 2b to a device power port 6b; a second MMS power line 7b leads from the power switch 2b to the SBC 3; and a third MMS power line 8b leads from the power switch 2b to a target machine power port 9b.

Figure 2:
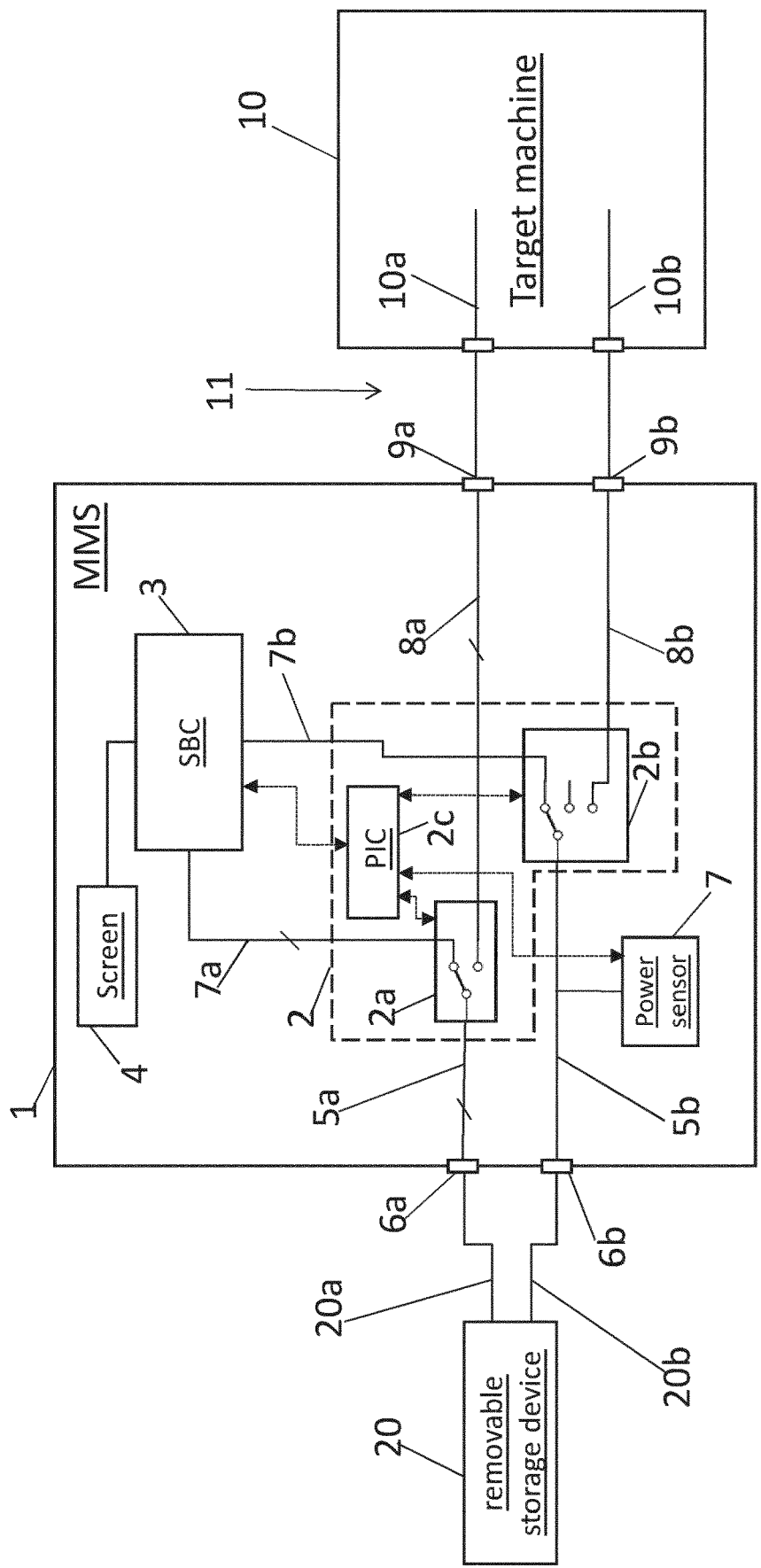
FIG. 2 is a schematic view of the MMS of FIG. 1 coupled to a removable storage device and target machine, with both switches in their first switching state.

The MMS 1 is a mobile device which can be physically coupled to a target machine 10 as shown in FIG. 2, then decoupled from the target machine 10 when the MMS 1 is not required. This coupling may be via a USB cable 11 for instance. The target machine 10 has a data line 10a connected to the third MMS data line 8a via the USB cable 11 and the target machine data port 9a; and a power line 10b connected to the third MMS power line 8b via the USB cable 11 and the target machine power port 9b. The USB cable 11 is plugged into one USB port of the target machine, and any other USB ports of the target machine may be disabled.

The function of the MMS 1 is to protect the target machine 10 from malware on a removable storage device 20 which is plugged into a socket of the MMS 1 so that it is connected to the MMS 1 as shown in FIG. 2. The storage device 20 has a data line 20a connected to the first MMS data line 5a via the device data port 6a, and a power line 20b connected to the first MMS power line 5b via the device power port 6b.

The SBC 3 runs custom software that is configured to operate the MMS 1 in order to protect the target machine 10 from malware on the storage device 20 by the method described below.

By default, the data switch 2a and power switch 2b are in first switching states shown in FIG. 2. Thus when the storage device 20 is plugged into the MMS 1 as shown in FIG. 2, it is powered up via a first power path shown in FIG. 2. The first power path comprises the power line 20b of the storage device connected to the power line 7b of the MMS 1 by the power switch 2b in the first switching state.

The powering up of the storage device 20 causes it to perform a handshake process with the SBC 3 via a first data path shown in FIG. 2. The first data path comprises the data line 20a of the storage device 20 connected to the data line 7a of the MMS 1 by the data switch 2a in the first switching state. This handshake process negotiates communications between the storage device 20 and the SBC 3.

The MMS 1 runs multiple types of malware detection software (virus checkers) such as McAfee™ or ClamAV™. In this case there are two types, but there may be three or more. After the handshake process is complete, the SBC 3 scans data on the storage device 20 with the malware detection software via the first data path. During the malware scanning step, the storage device 20 continues to be powered via the first power path.

During the malware scanning step, since the switches 2a, 2b are in their first switching states, the target machine 10 is isolated from the storage device 20. This is advantageous because it prevents the target machine 10 from being infected by malware from the storage device 20.

If malware is detected by the malware detection software, then the MMS 1 is operated to either quarantine the malware, or remove it from the storage device 20. Quarantining of the malware may involve replacing the malware with an encrypted version of the file which is stored on the storage device 20 along with the encryption key to enable recovery. The process will continue until all the data on the storage device 20 has been checked. The process may then be terminated, or the process may continue if some of the data on the storage device 20 is not malware. The progress of the malware scanning is shown to the operator by the screen 4.

After the data has been scanned with the malware detection software, and the storage device 20 passed as safe (i.e. with no malware, or any malware removed or quarantined), then the SBC 3 sends a command to the PIC processor 2c to switch to the target machine. The PIC processor 2c then manages the timing of the switching.

The PIC processor 2c checks whether the MMS 1 is coupled to the target machine 10 as shown in FIG. 2. If not, then the switches 2a, 2b remain in their default first switching states. If the check indicates that the target machine 10 is coupled to the MMS 1, then the PIC processor 2c operates the power switch 2b to switch from its first switching state to a second switching state shown in FIG. 3, thereby disconnecting the power line 20b of the storage device 20 from the power line 7b of the MMS 1 and powering down the storage device 20.

Figure 3:
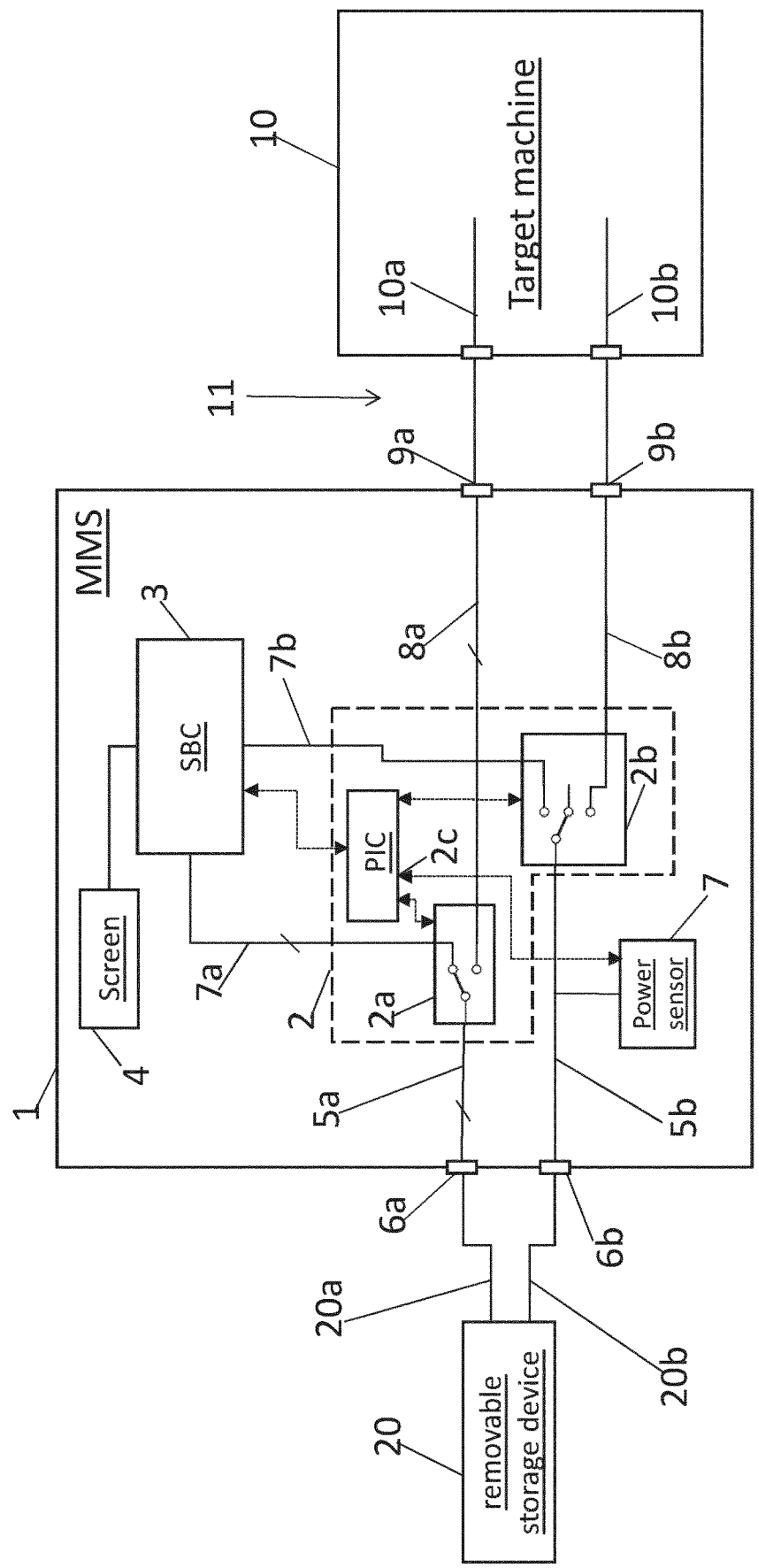
FIG. 3 shows the apparatus of FIG. 2 with the data switch in a first switching state and the storage device powered down with the power switch in a second switching state.
Figure 4:
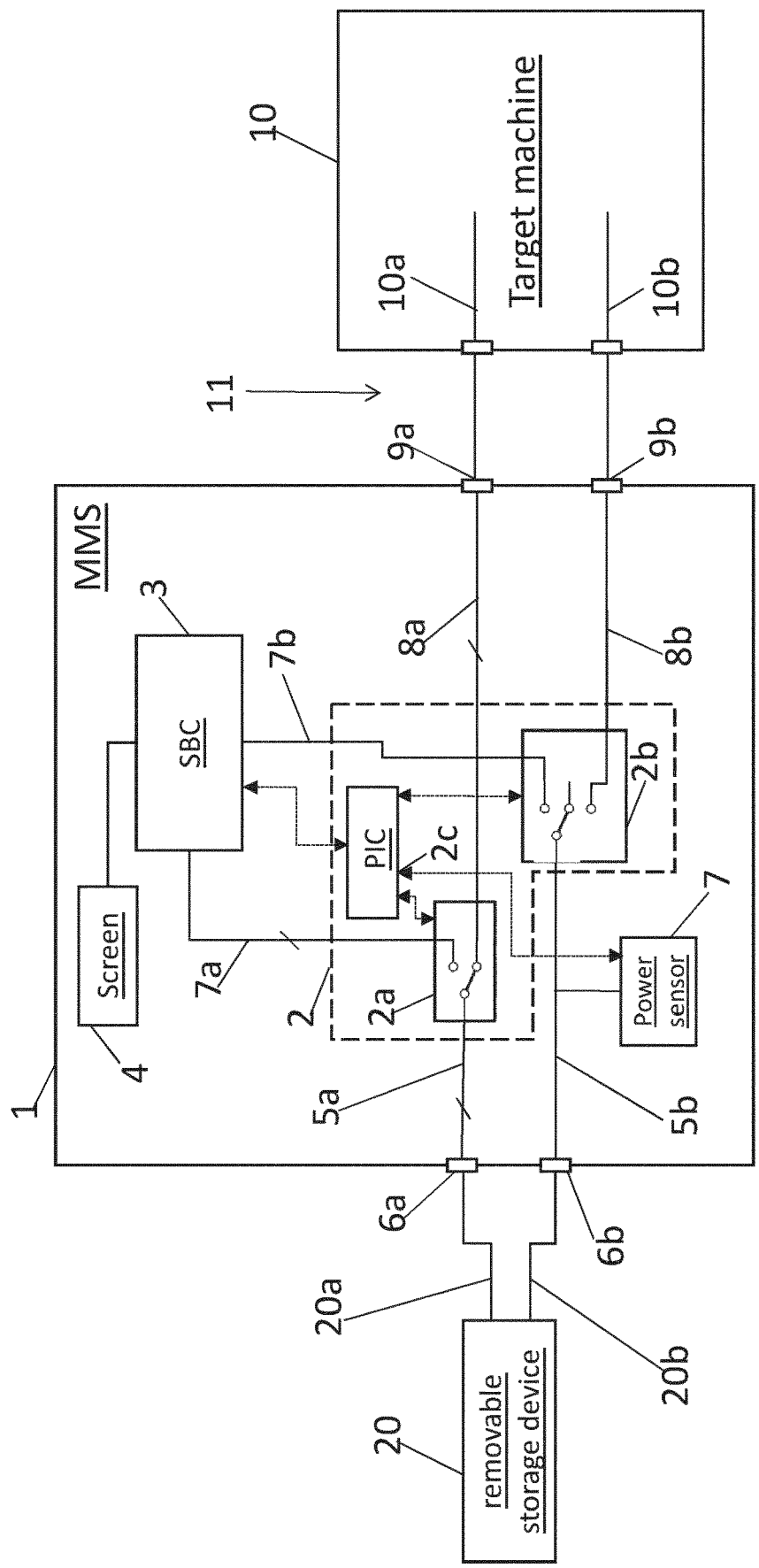
FIG. 4 shows the apparatus of FIG. 2 with the data switch in a second switching state and the power switch in the second switching state.

After the power switch 2b has been switched to power down the storage device 20 as shown in FIG. 3, the data switch 2a is switched from the first switching state of FIG. 3 to a second switching state shown in FIG. 4, thereby disconnecting the data line 20a of the storage device from the data line 7a of the MMS 1 and connecting the data line 20a of the removable storage device to the data line 10a of the target machine 10 to form a second data path. This second data path comprises the data line 20a of the storage device 20 connected to the data line 10a of the target machine 10 by the data switch 2a in the second switching state.

Figure 5:
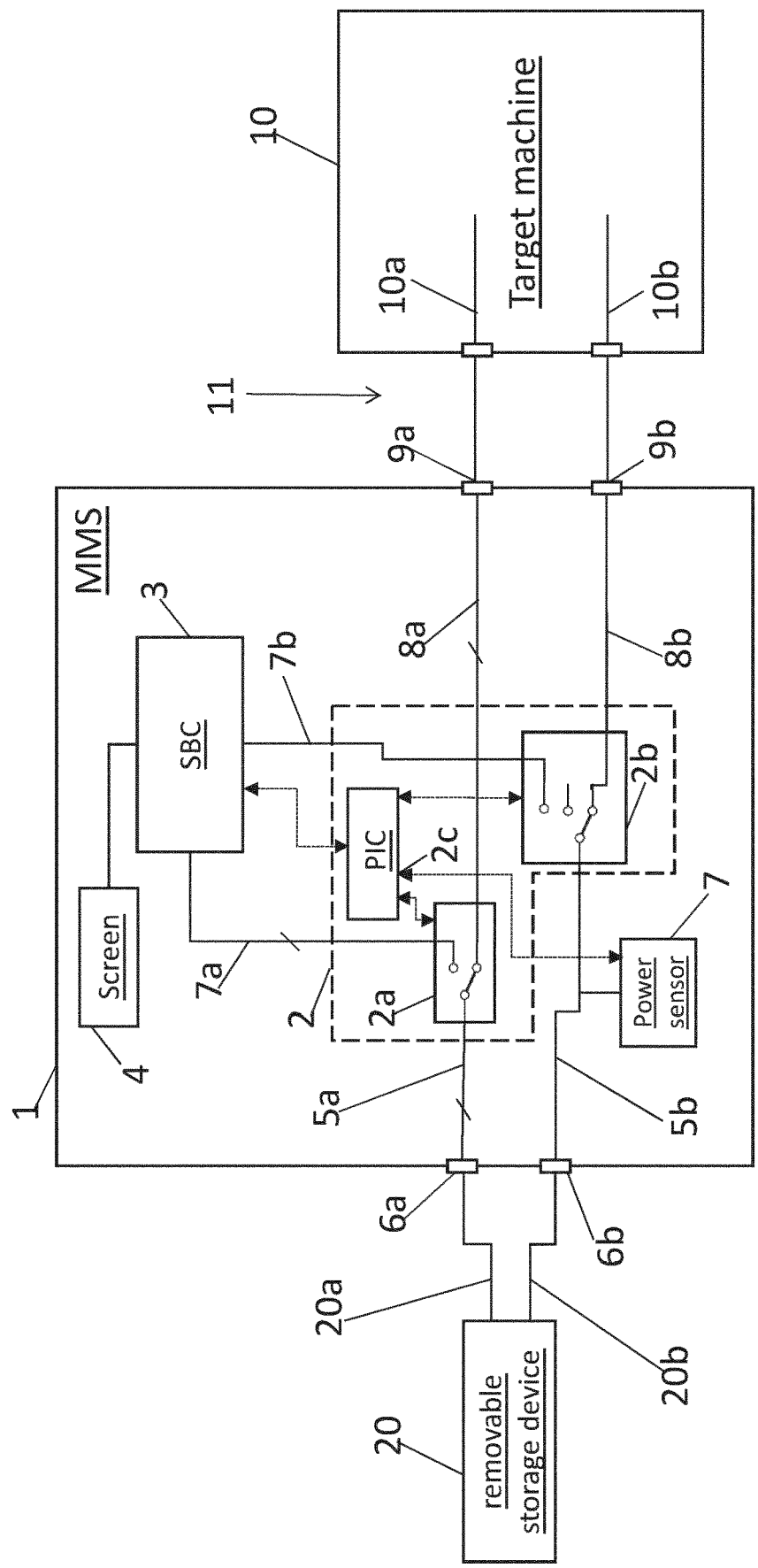
FIG. 5 shows the apparatus of FIG. 2 with the data switch in the second switching state and the storage device powered up with the power switch in a third switching state.

After the data switch 2a has been switched to its second switching state as in FIG. 4 with the storage device 20 powered down, the PIC processor 2c operates the power switch 2b to switch from its second switching state to a third switching state shown in FIG. 5, thereby connecting the power line 20b of the storage device to the power line 10b of the target machine 10. This causes the storage device 20 to be powered up for a second time via a second power path shown in FIG. 5. The second power path comprises the power line 20b of the removable storage device 20 connected to the power line 10b of the target machine 10 by the power switch 2b in the third switching state.

The powering up of the storage device 20 for a second time causes it to perform a handshake process with the target machine 10, similar to the handshake process previously described with the MMS 1. This handshake process negotiates communications between the storage device 20 and the target machine 10 via the second data path shown in FIG. 5. Note that the storage device 20 is powered up after the data switch 2a has been switched to the second switching state, so that the second data path is created before the removable storage device is powered up for the second time.

As noted above, after the data has been scanned with the malware detection software, the PIC processor 2c checks whether the MMS 1 is coupled to the target machine 10. If not, then the switches 2a, 2b remain in their default first switching states. This check prevents an undesirable oscillation which would otherwise occur in the absence of the check. Such an oscillation would operate as follows: the storage device 20 is powered down, an attempt to power up via the target machine 10 is performed, no power is available so the switches are returned to their first switching states, the MMS 1 will see this as a new incursion of a storage device and start again, the storage device 20 repeats the handshake and scanning steps with the MMS 1, and so on.

After the handshake is complete, the data is transferred from the storage device 20 to the target machine 10 via the second data path. During the handshake and data transfer steps, the storage device 20 continues to be powered via the second power path.

While the storage device is connected to the target machine, the SBC continuously checks whether the storage device 20 has been removed from the MMS 1. When the SBC 3 detects a removal of the removable storage device from the MMS 1, the data switch 2a and the power switch 2b are returned back to their first switching states as shown in FIG. 1, in response to the detection of the removal. Again, checking whether the storage device 20 has been removed from the MMS 1 before returning the switches 2a, 2b back to their first switching states prevents an undesirable oscillation similar to the one described above.

The removal of the storage device 10 from the MMS 1 is detected by a power sensor 7 which is arranged to monitor power being drawn by the first MMS power line 5b. When the power sensor 7 detects a reduction in power drawn by the storage device 10 via the second power path, this is taken by the SBC 3 as an indication that the storage device 10 has been removed.

Figure 6:
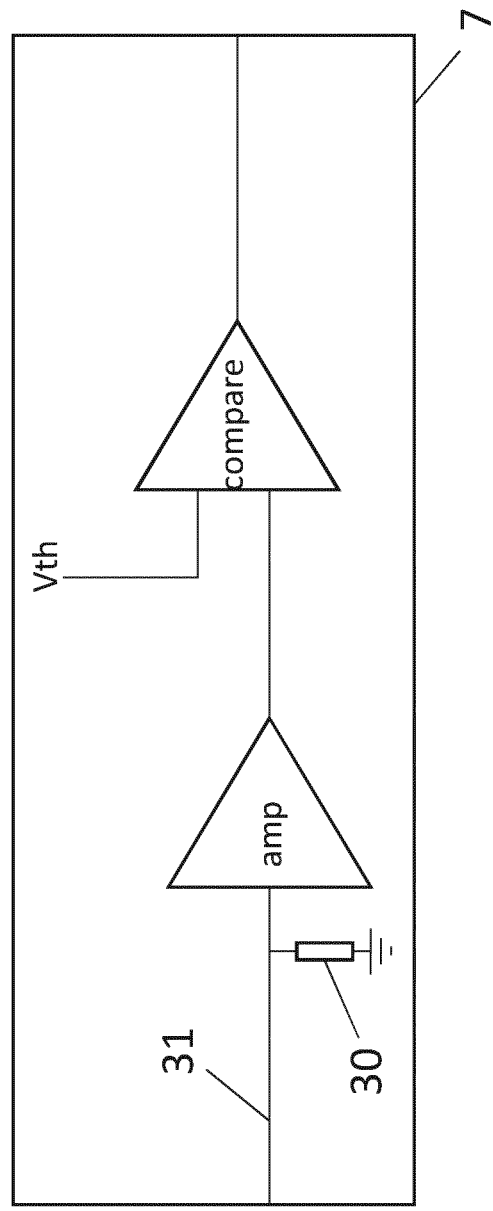
FIG. 6 shows the power sensor.

A preferred form of the power sensor 7 is shown in FIG. 6. The power sensor 7 measures a voltage across a 0.2 ohm resistor 30 in a 0V line 31. The reduction in power is detected by generating an amplified signal indicative of the current flow, and monitoring when the amplified signal drops below a threshold. A device connected signal is held high while the amplified signal is above the threshold, and reset when the amplified signal drops below the threshold indicating that the storage device 10 has been removed. This is monitored by the PIC processor 2c which passes the message on to the SBC 3. This resetting of the device connected signal informs the SBC 3 that the process is complete and the control program run by the SBC 3 can reset the system to await the next storage device to be tested.

As explained above, the MMS 1 is a mobile device which is physically coupled to the target machine 10 by a USB cable 11 during the handshake and data transfer steps. After the handshake and data transfer steps, the MMS 1 can be physically decoupled from the target machine 10 by unplugging the USB cable 11.

It is important that the power used by the storage device 10 is supplied by the same device that it is communicating with. This is achieved by the switching process described above. Within PCs/controllers the USB Host Controller chip controls the access to USB devices, it generates a "Port Change Interrupt" that lets the operating system know that a new device is available or that the device has been removed. One of the mechanisms used for the detection is the power management of the USB device.

As noted above, the target machine 10 is isolated from the storage device 20 during the malware scanning step. At no point is any active component of the MSS 1 (for instance the SBC 3 or PIC processor 2c) connected to the target machine 10.

The MMS 1 can be used in an industrial environment where USB removable media is used to transfer data between machines and workstations. The MMS 1 is particularly useful in an environment in which malware detection software cannot be installed on the target machine—which is often true in industrial environments.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A method of operating a media scanner to protect a target machine from malware on a removable storage device, wherein the target machine and the removable storage device each comprise a respective data line and power line, and the media scanner comprises a data switch and a power switch, the method comprising:
   a) scanning data on the removable storage device with malware detection software of the media scanner via a first data path, the first data path comprising the data line of the removable storage device connected to the data line of the media scanner by the data switch in a first data switch state;
   b) after the data has been scanned with the malware detection software, operating the data switch to switch from the first data switch state to a second data switch state, thereby disconnecting the data line of the removable storage device from the data line of the media scanner and connecting the data line of the removable storage device to the data line of the target machine;
   c) transferring the data from the removable storage device to the target machine via a second data path, the second data path comprising the data line of the removable storage device connected to the data line of the target machine by the data switch in the second data switch state; and
   d) after the removable storage device has been removed from the media scanner, returning the data switch back to the first data switch state;
   during the scanning step a), powering the removable storage device via a first power path, the first power path comprising the power line of the removable storage device connected to the power line of the media scanner by the power switch in a first power switching state;
   after the scanning step a), operating the power switch to switch from the first power switching state to a second power switching state, thereby disconnecting the power line of the removable storage device from the power line of the media scanner and powering down the removable storage device;
   after the removable storage device has powered down, operating the power switch to switch from the second power switching state to a third power switching state, thereby connecting the power line of the removable storage device to the power line of the target machine and powering up the removable storage device via a second power path, the second power path comprising the power line of the removable storage device connected to the power line of the target machine by the power switch in the third power switching state; during the data transfer step c), powering the removable storage device via the second power path; and
   after the removable storage device has been removed from the media scanner, returning the power switch back to the first power switching state.

2. The method of claim 1, wherein the powering up of the removable storage device causes the removable storage device to perform a handshake process with the target machine via the second data path before the data transfer step c).

3. The method of claim 1, wherein the removable storage device is powered up after the switching step b), so that the second data path is created before the removable storage device is powered up.

4. The method of claim 1, further comprising operating the media scanner to detect a removal of the removable storage device from the media scanner, wherein the data switch and/or the power switch is returned back to the first power switching state in response to the detection of the removal.

5. The method of claim 1, wherein the removal of the removable storage device from the media scanner is detected by detecting a reduction in power drawn by the removable storage device via the second power path.

6. The method of claim 5, wherein the reduction in power is detected by detecting a reduction in current flow.

7. The method of claim 6 wherein the reduction in current flow is detected by generating an amplified signal indicative of the current flow, and monitoring when the amplified signal crosses a threshold.

8. The method of claim 1, further comprising operating the media scanner to check whether the media scanner is coupled to the target machine, and operating the data switch in step b) to switch from the first switching state to the second switching state if the check indicates that the target machine is coupled to the media scanner.

9. The method of claim 1, wherein the media scanner is a mobile device which is physically coupled to the target machine during the data transfer step c), and the method further comprises physically decoupling the media scanner from the target machine after the data transfer step c).

10. The method of claim 1, further comprising quarantining or removing malware if detected by the malware detection software.

11. A media scanner comprising a data line, a data switch, malware detection software, and a computer which is configured to operate the media scanner in order to protect a target machine from malware on a removable storage device by the method of claim 1.

12. The media scanner of claim 11, wherein the media scanner is a mobile device which can be physically coupled to the target machine and physically decoupled from the target machine.

* * * * *